Figures 1, 2, 3:
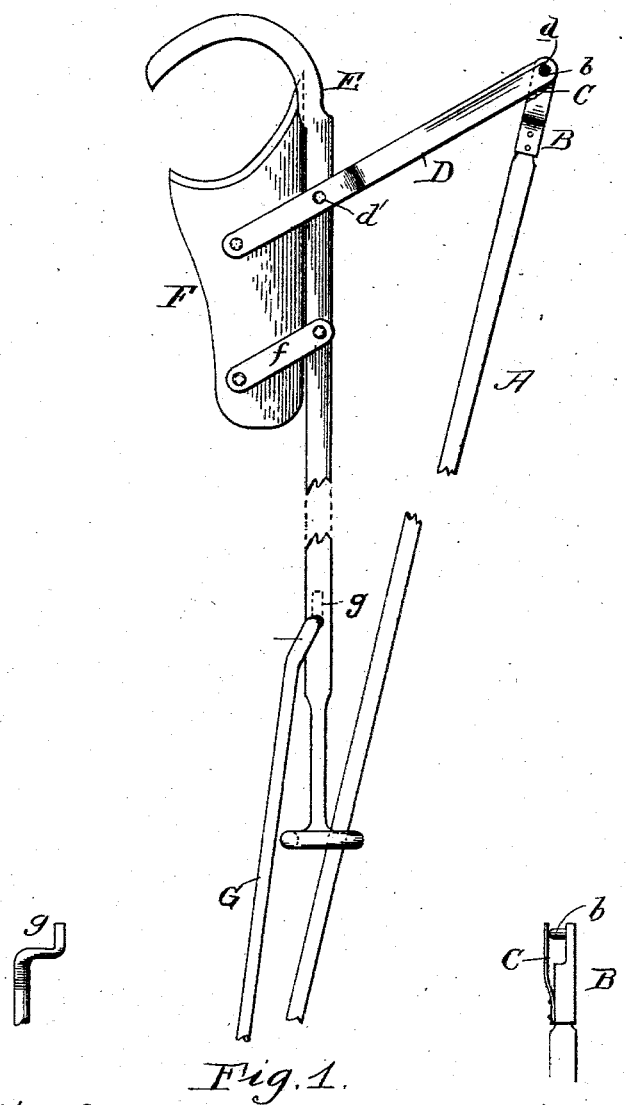

No. 634,607. J. H. BOWERS. Patented Oct. 10, 1899.
PRUNING IMPLEMENT.
(Application filed June 1, 1899.)

(No Model.)

Witnesses Inventor
John H. Bowers,
By Milo B. Stevens & Co.
Attorneys

UNITED STATES PATENT OFFICE.

JOHN H. BOWERS, OF ROANOKE, LOUISIANA.

PRUNING IMPLEMENT.

SPECIFICATION forming part of Letters Patent No. 634,607, dated October 10, 1899.

Application filed June 1, 1899. Serial No. 718,979. (No model.)

*To all whom it may concern:*

Be it known that I, JOHN H. BOWERS, a citizen of the United States, residing at Roanoke, in the parish of Calcasieu and State of Louisiana, have invented certain new and useful Improvements in Pruning Implements; and I do hereby declare the following to be a full, clear, and exact description of the invention, such as will enable others skilled in the art to which it appertains to make and use the same.

This invention relates to improvements in pruning implements; and it consists in a construction of arrangements of parts hereinafter described, and defined in the claims.

The object of the invention is to provide a pruning implement with a peculiar shaped knife, whereby rapid and positive draw-cuts can be made.

The invention further comprehends means for rapidly and easily detaching the actuating-handle from the blade, so that the handle can be replaced by a longer or shorter one where necessity requires.

In the accompanying drawings I have shown an embodiment of my invention and desire it understood that slight alterations and changes can be made without departing from the principle thereof.

In the drawings, Figure 1 is a side elevation of the implement, showing the knife in position to move and cut and in the dotted lines after the cut is made. Fig. 2 is a detailed view of a detachable connection between the actuating-handle and knife-lever. Fig. 3 is a detailed view of a connection between a detachable supporting-rod and a hook member.

In the drawings, A represents the actuating-handle, carrying at the upper end a stem B, which is formed with a right-angled offset $b$. On the side of this stem, below the offset, is secured a spring-tongue C, the end of which rests against the end of the offset. The offset is conveniently cylindrical and projects through an eye $d$, formed on the end of the knife-lever D. The knife-lever D is conveniently a straight bar, although any desired form of bar may be used, and its upper end is attached to the handle, and it is pivotally connected by a fulcrum-pin $d'$ to the supporting or holding hook E.

The holding-hook E is of the usual well-known form, having a loop at its lower end, through which the handle passes, the hook portion being at the upper end above the fulcrum $d'$.

F designates the cutting-blade, having a vertical side or edge opposite that of the straight portion of the hook-handle, against which it normally rests when not being used. The lower end of the blade is connected to the hook member by a link connection $f$. At about the center it is connected loosely to the projecting end of the blade-lever D. The cutting edge of the blade is conveniently concave, as shown, the lowermost portion being the outer portion, while the upper portion is extended up a considerable distance above the lower end and conveniently lies close to the side of the hook portion of the hook member for purposes presently to be stated. In cutting small limbs or twigs and outlying branches, where the hook member cannot well be used by itself, I employ the detachable extension G. This extension has on its upper end a right-angled offset $g$, the outer end of which is turned upward. This offset portion is placed in an opening in the lower end of the hook member, and when brought in a position where it will be at right angles to the hook member it is held from being moved in or out by virtue of the upturned end and the stem portion of the same. It can be rapidly removed by tilting same upward, so as to bring the stem at substantially right angles to the hook member. This actuating-bar is advantageous when the implement is to be used at any great height, when the hand of the operator cannot reach and take hold of the lower end of the hook member E.

In operation when it is desired to sever a branch the hook is placed thereover and the handle is drawn down, the hook being prevented from being moved downward by the branch. The knife is thereupon forced upward, the shear or incline cutting edge severing the branch. The cutting is continued until the lower concave portion is reached, at which time it is easy to complete the severance by a direct cut. It will therefore be seen that the concavity of the blade is important. The blade is secured and located or closely associated with the hook, so that its upward movement is not impeded or interfered with by the hook, while the hook maintains its position on the trunk portion of the branch until after the branch has been wholly severed.

It is thought that the advantages of the two detachable connections referred to will be undoubtedly appreciated and understood.

Having thus described my invention, what I claim, and desire to secure by Letters Patent, is—

1. In an implement of the character described, the combination with a hook member, a reciprocating knife having link connections therewith, a lever for actuating the knife, having an eye in its rear end, an actuating-handle having an offset at its upper end projecting through the eye and a spring-tongue for securing the offset in the eye, substantially as described.

2. In an implement of the character described, the combination with a hook member having an opening near its lower end a knife-lever and a blade actuated thereby and an actuating-handle connected with the knife-lever, of a supporting-bar having a shank at its upper end formed with a right-angled offset, the upper end of which is turned upward at an angle and fitted through an opening in the hook member whereby the supporting member will be held against displacement when in alinement with the hook member but can be rapidly removed when adjusted outwardly therefrom, substantially as described.

3. In a pruning implement of the character described, the combination with a hook member, a knife-blade, a supporting-link connected to the lower portion of the knife-blade, a knife-lever journaled on the hook member, projecting in opposite directions therefrom, a handle loosely connected to the free end of the knife-lever for actuating the same passing through and guided by a portion of the hook member, and a detachable supporting-bar adapted to engage the hook member at a point intermediate its ends, substantially as described.

In testimony whereof I affix my signature in presence of two witnesses.

JOHN H. BOWERS.

Witnesses:
A. A. DWIGANS,
M. L. PRENTICE.